(12) United States Patent
Kardohely et al.

(10) Patent No.: US 6,173,940 B1
(45) Date of Patent: Jan. 16, 2001

(54) VALVE BALL CONFIGURATION

(75) Inventors: Michael J. Kardohely, West Salem; Adam Pintz, Strongsville, both of OH (US)

(73) Assignee: Premier Farnell Corp., Cleveland, OH (US)

( * ) Notice: Under 35 U.S.C. 154(b), the term of this patent shall be extended for 0 days.

(21) Appl. No.: 09/343,639

(22) Filed: Jun. 30, 1999

(51) Int. Cl.$^7$ .................................................. F16K 5/06
(52) U.S. Cl. ................................. 251/283; 251/315.16
(58) Field of Search ............................. 251/283, 315.16, 251/315.01, 309, 281

(56) References Cited

U.S. PATENT DOCUMENTS

| | | |
|---|---|---|
| 2,545,220 | * 3/1951 | Wolcott, Jr. ......................... 251/283 |
| 2,765,142 | * 10/1956 | Ludeman .............................. 251/283 |
| 3,689,027 | 9/1972 | Grenier . |
| 3,722,859 | 3/1973 | Murphy et al. . |
| 3,784,155 | 1/1974 | Tomlin . |
| 4,103,868 | 8/1978 | Thompson . |
| 4,423,749 | 1/1984 | Schmitt . |
| 4,542,878 | 9/1985 | Kulisek . |
| 5,435,521 | 7/1995 | Jarecki . |
| 5,979,873 | * 11/1999 | Wu .................................. 251/315.16 |

* cited by examiner

Primary Examiner—Kevin Shaver
Assistant Examiner—Eric Keasel
(74) Attorney, Agent, or Firm—Jones, Day, Reavis & Pogue

(57) ABSTRACT

A valve ball physically configured to minimize rotational forces imparted to the ball by fluid pressure acting thereon in flow throttling positions of the ball. In part, the physical configurations that produce the desired effect include a hollowed out ball interior and recessed areas on the ball outer surface that allow fluid flow past the ball exterior when it is partly open.

21 Claims, 3 Drawing Sheets

VALVE BALL CONFIGURATION

BACKGROUND OF THE INVENTION

This application relates to the art of ball valves and, more particularly, to a physical configuration of a valve ball that minimizes fluid pressure forces tending to rotate the ball when it is partly open. Although the invention will be shown and described with reference to a ball valve that has two seals, it will be appreciated that the improvements can be used in ball valves that have one seal.

Ball valves are used to control or throttle flow rates by adjusting the valve ball to a partly closed position. Fluid pressure acting on the valve ball tends to rotate the valve ball out of its desired position and undesirably change the flow rate. Therefore, braking or locking mechanisms are required to positively hold the valve ball in a desired position for maintaining a substantially constant throttled flow rate. These mechanisms may include manually engaged locks, braking mechanisms that are engaged by movement of the valve ball without an input to the adjustment handle, or adjustment mechanisms that provide inherent braking action such as a worm gear drive. Minimizing the fluid pressure forces that tend to move the valve ball from its desired position would make it possible to simplify or eliminate the locking or braking mechanisms.

SUMMARY OF THE INVENTION

In accordance with the present application, a valve ball is physically configured to minimize rotational forces imparted thereto by fluid pressure acting thereon when the ball is in a partly closed position for regulating the flow rate therethrough. In part, the physical configuration that minimizes the undesired forces includes a hollowed out ball interior and recessed areas on the ball outer surface that allow fluid flow past the exterior of the ball when it is between approximately ¼–¾ open.

In one arrangement, the exterior surface of the valve ball is generally spherical with opposite recessed areas that provide fluid flow past the valve ball seals and around the outer periphery of the ball when it is partly open. The recessed areas have outer surface profiles that preferably are substantially flat and substantially circular. A passage through the ball has a passage periphery that defines a valve ball inner surface that is provided with inner surface profiles located opposite from and substantially corresponding in size and shape to the outer surface profiles.

In a preferred arrangement, the ball has inner and outer surfaces that are geometrically similar except in the vicinity of the intersection of the ball rotational axis with the ball inner and outer surfaces.

In accordance with another aspect of the application, the valve ball is hollowed out so that the passage through the valve ball is enlarged between the passage inlet and outlet openings. In a preferred arrangement, the interior surface shape of the valve ball is substantially the same as the external surface shape of the valve ball so that the wall thickness between the inner and outer surfaces is substantially uniform.

The passage through the valve ball has circular inlet and outlet openings of the same diameter. The circular flat areas on the external surface of the ball may have a diameter that is 55–85% of the passage inlet/outlet opening diameter and more preferably 70–80% of such diameter. The circular flat areas also have a diameter that may be between 35–55% of the diameter of the generally spherical valve ball.

It is a principal object of the present invention to provide an improved valve ball configuration.

It is another object of the invention to provide a valve ball that is configured to minimize fluid pressure forces that tend to rotate the ball out of a desired partly closed position.

It is also an object of the invention to provide an improved valve ball that is economical to manufacture.

It is an additional object of the invention to provide an improved valve ball having both external and internal configurations that aid in minimizing fluid pressure forces that tend to rotate the valve ball from a desired position.

It is another object of the invention to provide a valve ball that is configured to have a more balanced distribution of fluid pressure forces acting thereon with respect to the ball rotational axis.

It is a further object of the invention to provide a valve ball configuration that minimizes pressure forces tending to close the ball when it is in a throttling position.

DESCRIPTION OF A PREFERRED EMBODIMENT

Figure 1:
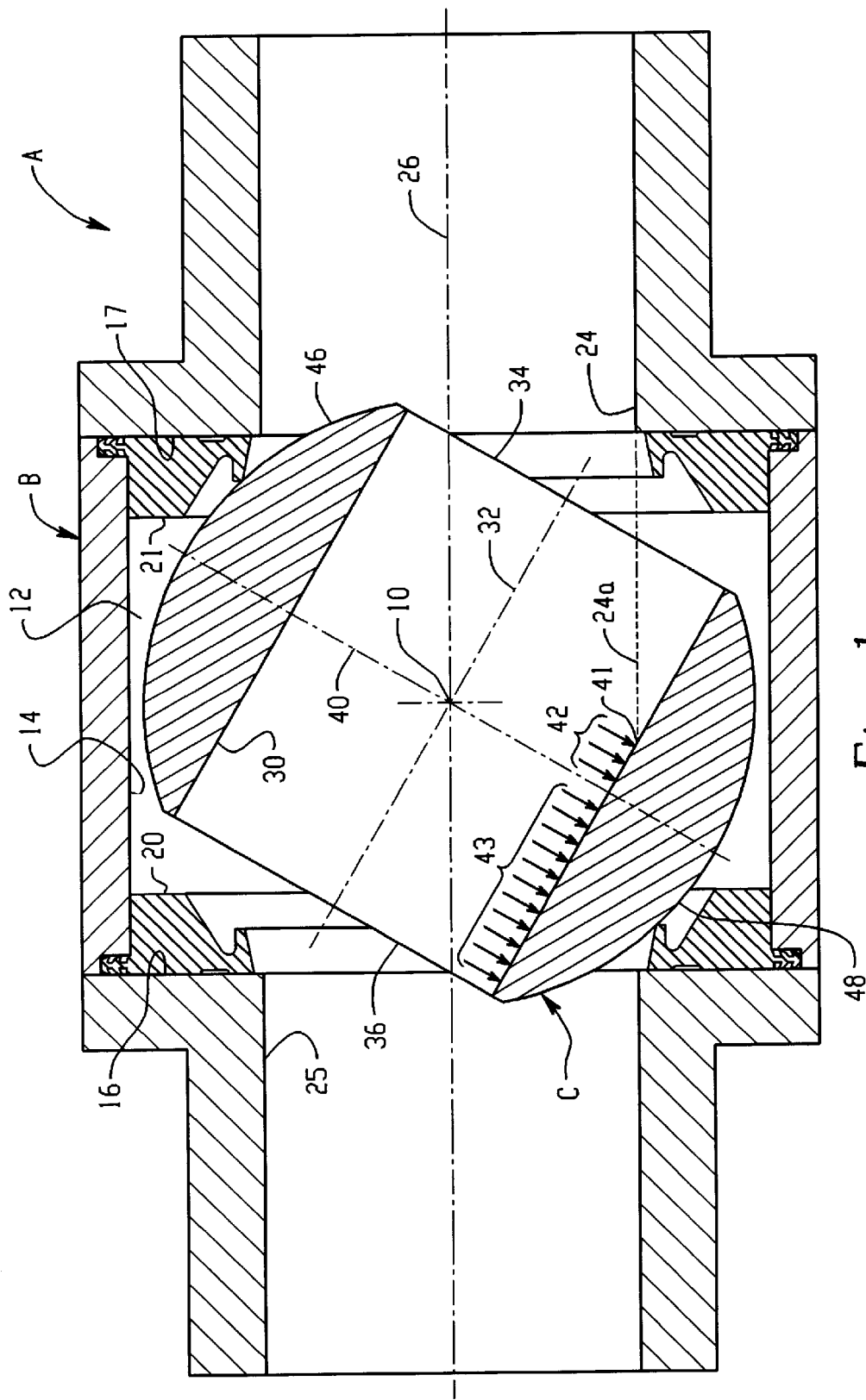
FIG. 1 is a cross-sectional side elevational view of a prior art ball valve.

Referring now to the drawing, wherein the showings are for purposes of illustrating a preferred embodiment of the invention only and not for purposes of limiting same, FIG. 1 shows a ball valve A having a housing B in which a generally spherical valve ball C is rotatably received for rotation about a rotational axis 10 extending perpendicular to the plane of the paper. Housing B includes a valve ball chamber 12 having an inner periphery 14 and opposite end walls 16, 17 against which elastomeric seals 20 and 21 are positioned.

Circular inlet and outlet ports 24 and 25 for ball chamber 12 are aligned along a longitudinal chamber axis 26. Chamber inner periphery 14 is spaced radially outwardly from inlet and outlet ports 24, 25, and end walls 16, 17 extend generally radially of chamber axis 26 between inlet and outlet ports 24, 25 and chamber inner periphery 14. Although flow could take place in either of opposite directions, the example is explained with flow taking place from right-to-left. The improvements of the present application also can be used in valves having only one seal rather than two as shown and described herein.

Valve ball C has a central cylindrical passage 30 with a longitudinal passage axis 32, and circular inlet and outlet openings 34, 36. Valve ball C has a central transverse axis 40 that intersects and extends perpendicular to ball rotational axis 10 and passage longitudinal axis 32. When valve ball C is rotated to a position wherein ball passage axis 32 extends perpendicular to chamber axis 26, valve A is closed and the spherical outer surface of valve ball C is in engagement with both of seals 20 and 21 over 360°. When valve ball C is rotated to a position in which ball passage axis 32 is coincidental with chamber axis 26, valve A is fully open. Valve ball C is rotatable to partly open positions between its fully closed and open positions for regulating or throttling flow through valve A.

In the explanation that follows, only a few examples of fluid pressure forces that act on valve ball C will be mentioned. It will be recognized that there are a much larger number of fluid pressure forces acting on other areas of valve ball C and those that are specifically mentioned are simply by way of example. This type of valve ball has an uneven distribution of pressure forces acting thereon relative to the ball rotational axis and these unbalanced forces tend to rotate the ball from a partly open or partly closed position toward the fully closed position.

In the partly open or throttled position of valve ball C illustrated in FIG. 1, the imaginary extension of inlet port 24 is represented by dotted line 24a that intersects the surface of ball passage 30 as indicated at 41 on the right side of ball transverse axis 40. That is, intersection 41 is between transverse axis 40 and inlet port 24, and there are high pressure forces 42 tending to rotate ball C clockwise toward a closed position as well as high pressure forces 43 tending to rotate ball C counterclockwise toward a more open position.

Fluid pressure also acts on an outer surface area of valve ball C generally indicated at 46 that is located between ball inlet opening 34 and seal 21. The fluid pressure acting on this surface area also tends to rotate valve ball C clockwise about rotational axis 10 toward a closed position.

Fluid pressure also is acting on an outer surface area of valve ball C that is generally indicated at 48 and is located between ball transverse axis 40 and seal 20. That is, on the downstream side of transverse axis 40. This fluid pressure force also is acting on valve ball C to rotate same clockwise about rotational axis 10 toward a closed position.

The total pressure forces tending to rotate the ball clockwise are greater than other pressure forces tending to rotate the ball counterclockwise. The net result is a fluid pressure force that tends to rotate the valve ball toward a closed position from virtually all throttling positions between fully open and fully closed. Because the outer surface of valve ball C is spherical, the outer surface always engages both seals 20 and 21 over a portion of their circumference and there is no direct path for flow of fluid around the outside of valve ball C past both seals 20 and 21.

The improved valve ball configuration of the present application is intended to balance or equalize the fluid pressure forces tending to rotate the valve ball out of a desired partly open position and also provides direct fluid flow past both seals externally of the valve ball.

FIGS. 2–5 show a valve ball D configured in accordance with the present application. Valve ball D has a generally spherical outer surface 50 and a longitudinal rotational axis 52. A passage through valve ball D has a longitudinal passage axis 54 that intersects and extends perpendicular to rotational axis 52. The valve ball passage has circular inlet and outlet openings 56, 58 that are of the same diameter and are aligned with one another coincidental with passage axis 54.

The outer surface of valve ball D has a generally rectangular external recess 60 and a cylindrical hole 62 coincidental with rotational axis 52. Opposite from recess 60 and hole 62, valve ball D has an internal cylindrical boss 64 and a cylindrical hole 66 coincidental with rotational axis 52. Cylindrical hole 66 is adapted to receive a pin for rotatably mounting valve ball D in a valve housing in a known manner. Cylindrical hole 62 is adapted to receive a pin on an actuator receivable in recess 60 for applying rotational forces to valve ball D in a known manner.

Figure 2:
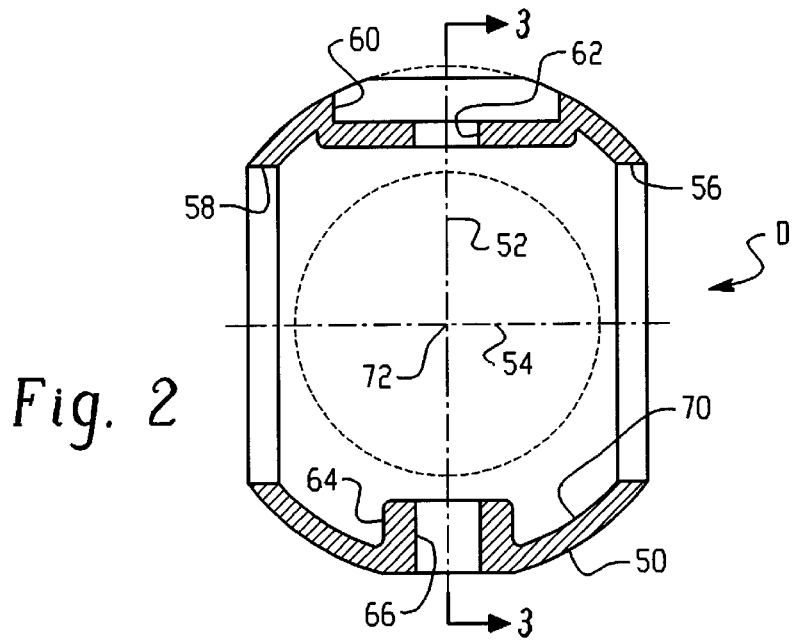
FIG. 2 is a cross-sectional side elevational view of a valve ball in accordance with the present application.
Figure 3:
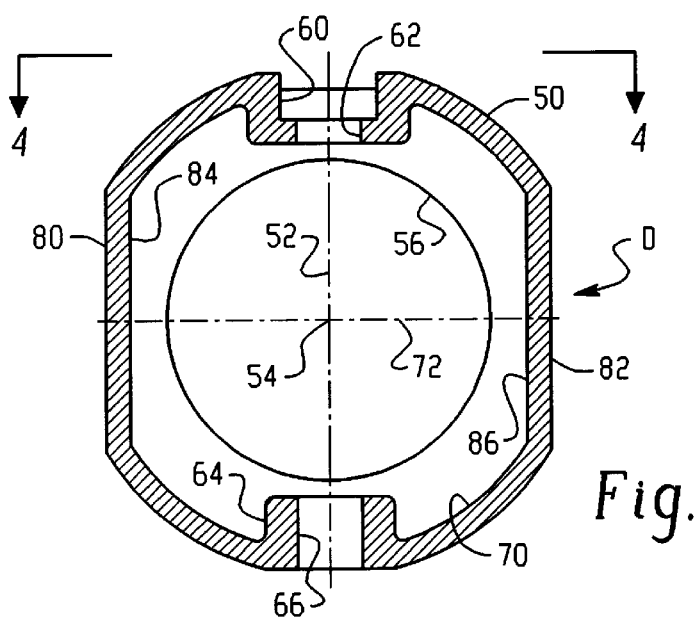
FIG. 3 is a cross-sectional elevational view taken generally on line 3—3 of FIG. 2.
Figure 4:
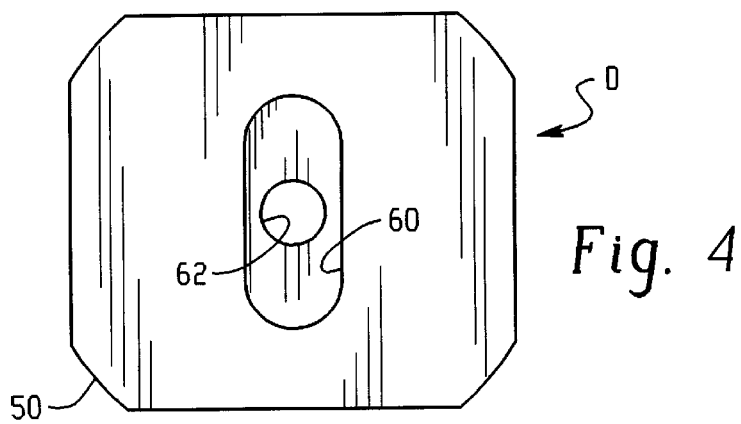
FIG. 4 is a top plan view taken generally on line 4—4 of FIG. 3.

The interior of valve ball D is hollowed out between passage inlet and outlet openings 56, 58 so that the passage periphery generally indicated at 70 defines a valve ball inner surface that is spaced outwardly beyond the periphery of openings 56, 58. In addition, the valve ball wall that is defined between the ball inner and outer surfaces has a substantially uniform thickness as indicated in FIGS. 2 and 3.

Valve ball D has a transverse axis 72 that intersects and extends perpendicular to both rotational axis 52 and passage axis 54. The external surface of valve ball D is provided with recessed areas 80, 82 aligned with transverse axis 72. Although external recessed areas 80, 82 may take other forms, they have a surface profile that is substantially flat and substantially circular in the preferred form. Each flat circular external area 80, 82 is coincidental with transverse axis 72 and has a corresponding flat circular internal area 84, 86. In the arrangement shown, flat circular internal surface areas 84, 86 are spaced-apart a distance that is about 25% greater than the diameter of each opening 56, 58. Obviously, this spacing may vary and preferably is between about 20–35% greater than the diameter of each opening 56, 58.

In the arrangement shown, external flat circular areas 80, 82 each has a diameter that is about 75% of the diameter of an opening 56, 58. Obviously, the flat areas may have other diameters and may be about 55–85% of an opening diameter, and more preferably between 70–80% of an opening diameter.

Figure 5:
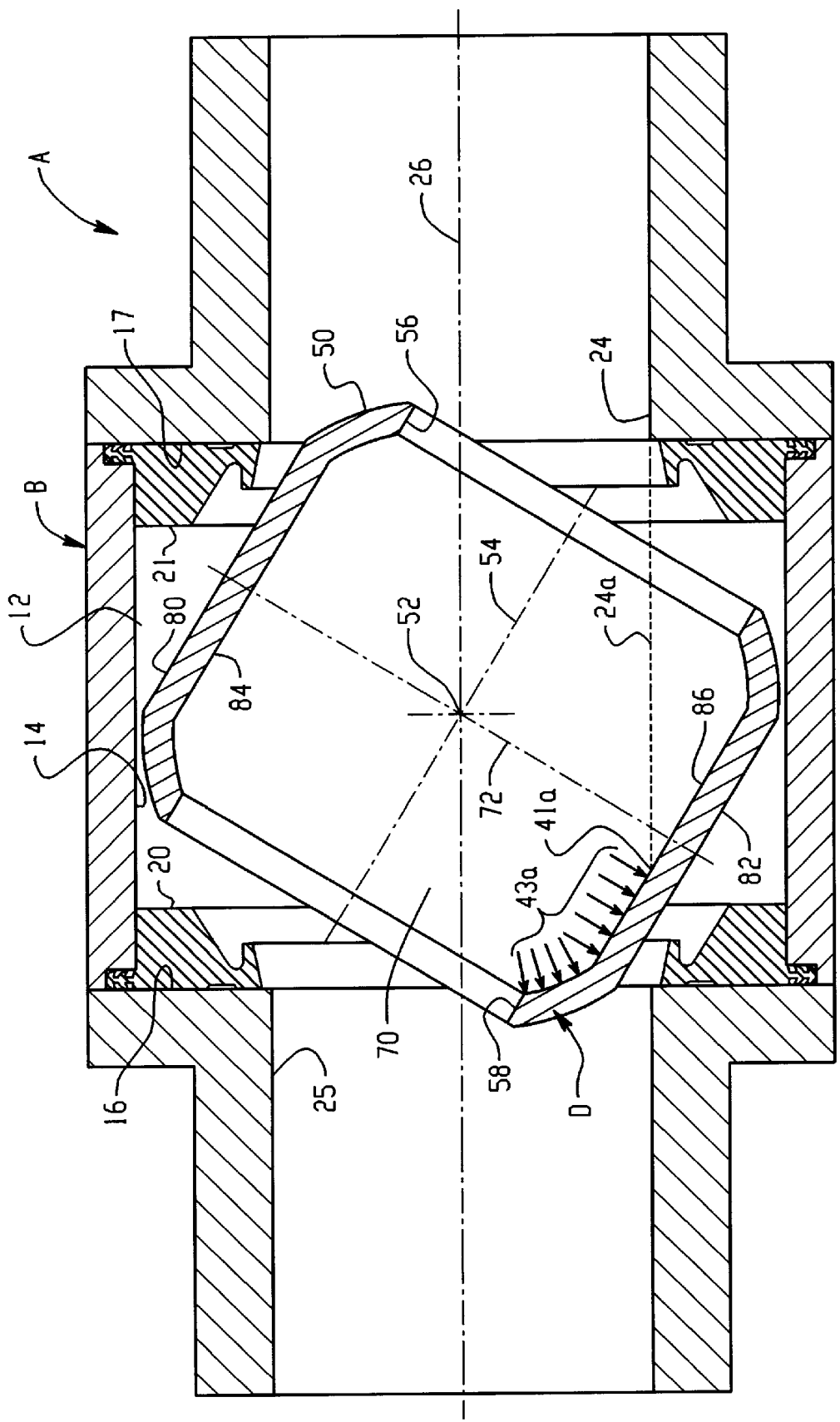
FIG. 5 is a cross-sectional side elevational view of a ball valve having the improved valve ball of the present application incorporated therein.

As shown in FIG. 5, the imaginary extension of inlet port 24 is represented by dotted line 24a that intersects the surface of ball flat internal surface 86 as indicated at 41a on the left side of ball transverse axis 72. That is, intersection 41a is between transverse axis 72 and outlet port 25. Thus, the high pressure forces 42 of FIG. 1 acting to rotate ball C clockwise closed are shifted to the opposite side of ball transverse axis 72 in FIG. 5 and are included in pressure forces 43a.

In the arrangement of FIG. 5, external flat circular areas 80, 82 are completely separated from seals 20, 21 in the partly open positions of valve ball D between approximately ¼–¾ open so that fluid flow can take place directly around the exterior of the valve ball. This further relieves the pressure forces on the exterior surface of the ball that tend to rotate the ball out of a throttling position, and also provides flushing action to clean the seals and remove debris that may interfere with good sealing when the valve ball is closed.

The interior of the ball is hollowed out to provide a substantially uniform thickness in both the flat and spherical areas of the ball. This improves ball integrity and manufacturability, and minimizes ball material and weight. The size of the flat areas is maximized under the constraint that a seal consistently must be achieved on the outer spherical area of the ball located between the periphery of the ball passage openings and the flat areas. Making these spherical areas as small as possible maximizes the flat areas and allows flow past the seals around the exterior of the ball with very little ball rotation. This also reduces sudden fluid pressure forces on the ball as it begins to close. Removing as much material as possible from the interior of the ball moves the force of water on the ball interior as far downstream as possible. This is an important consideration in order to approach balanced fluid pressure forces acting on the ball in the range of open positions between one fourth and three fourths open.

Moving the fluid pressure forces 42 of FIG. 1 to the downstream side of the ball in FIG. 5 not only removes the closing force produced by that force acting on the upstream side of the ball, it also provides a torque in the opposite direction to better balance the pressure forces on the ball. The smooth convergence of the ball interior surface toward the periphery of passage outlet opening 58 also provides a surface that extends at an angle of 35–45° to inner flat area 86 so that water pressure acting thereon also acts on the ball to produce rotational force in a direction opposite to the undesired closing direction.

The valve ball of the present application has inner and outer surfaces with geometrically similar shapes except in the immediate vicinity of the intersection of rotational axis 52 with the ball. In these intersection areas, the surfaces are different due to the rotational mounting and torque applying features provided by recess 60 and boss 64.

Substantially flat areas 80, 82, 84 and 86 could have surface profiles other than substantially flat such as slightly concave or convex. However, substantially flat is preferred. The substantially flat areas are parallel to one another and to passage axis 54. The inner surface of the ball provided by the passage 70 directly intersects the cylindrical peripheral surface of each ball passage opening 56, 58. The axial extent of the cylindrical periphery of each ball passage opening 56, 58 is no greater than that provided by the ball wall thickness between its inner and outer surfaces 50, 70.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A valve ball having a generally spherical outer surface, a through passage with a passage longitudinal axis and a passage peripheral surface that defines a ball inner surface, said ball having a rotational axis that intersects and extends perpendicular to said passage longitudinal axis and a transverse axis that intersects and extends perpendicular to both said rotational axis and said passage longitudinal axis, said outer surface having opposite recessed areas intersected by said transverse axis on opposite sides of said passage longitudinal axis, said recessed areas having outer surface profiles, said inner surface having inner surface profiles that are located opposite from and substantially correspond to said outer surface profiles, said passage having opposite passage openings that intersect said generally spherical outer surface, and said recessed areas being spaced from said passage openings so that said generally spherical outer surface includes generally spherical outer surface portions that extend between said recessed areas and said passage opening.

2. The valve ball of claim 1 wherein said outer and inner surface profiles are substantially flat surfaces.

3. The valve ball of claim 2 wherein said substantially flat surfaces have substantially circular outer peripheries.

4. The valve ball of claim 1 wherein said passage has circular inlet and outlet openings coincidental with said passage longitudinal axis, said inlet and outlet openings being of the same diameter and each of said openings having an opening periphery, said passage inwardly of said openings having a larger cross-sectional size than each of said openings, and said passage peripheral surface inwardly of said openings being spaced outwardly of said opening periphery so that the internal size of the passage is greater than the size of said openings.

5. The valve ball of claim 1 wherein said ball has a wall that is defined between said inner and outer surfaces and said wall has a substantially uniform thickness throughout substantially its entire extent between said inner and outer surfaces.

6. The valve ball of claim 1 wherein said inner and outer surfaces have geometrically similar shapes, said inner surface profiles substantially corresponding in size and shape to said outer surface profiles, and said spherical outer surface portions being in surrounding relationship to said passage openings.

7. A valve ball having a generally spherical outer surface and a through passage with a passage peripheral surface that defines a ball inner surface, said outer surface having a pair of substantially flat outer surface areas with substantially circular outer peripheries on opposite sides of said passage, and said inner surface having a pair of substantially flat inner surface areas with substantially circular outer peripheries aligned with said outer surface areas.

8. The valve ball of claim 7 wherein said passage has circular inlet and outlet openings, said openings being of substantially the same diameter and having an outer periphery, and said passage inwardly of said openings being larger than said openings with said passage peripheral surface spaced outwardly of said opening periphery so that the internal size of the passage is greater than the size of said openings.

9. The valve ball of claim 7 wherein said inner and outer surfaces have geometrically similar shapes.

10. The valve ball of claim 7 wherein said ball has a wall defined between said inner and outer surfaces and said wall has a substantially uniform thickness throughout its extent between said inner and outer surfaces.

11. In a valve assembly including a valve ball chamber having circular inlet and outlet ports aligned along a chamber longitudinal axis and a chamber periphery spaced radially outwardly from said ports, said chamber having end surfaces extending between said periphery and said ports, at least said end surface adjacent said outlet port having a seal thereon, a valve ball rotatably received in said chamber for rotation about a rotational axis and having a generally spherical outer surface for cooperation with said seal, said valve ball being physically configured to minimize pressure forces tending to close the ball during throttling, said valve ball having a through passage with a passage longitudinal axis and circular inlet and outlet openings, said valve ball being hollowed out between said openings to provide said passage with a passage periphery between said openings that has a larger cross-sectional area than the cross-sectional area of each of said openings, and said passage periphery having opposite substantially flat passage areas on opposite sides of said rotational axis and said passage longitudinal axis.

12. The valve assembly of claim 11 wherein said substantially flat passage areas have substantially circular outer peripheries.

13. The valve assembly of claim 12 wherein said inlet and outlet openings have a common opening diameter and each of said substantially circular areas has an area diameter that is 55–85% of said opening diameter.

14. The valve assembly of claim 13 wherein said area diameter is 70–80% of said opening diameter.

15. The valve assembly of claim 12 wherein said valve ball has a fully open position in which said chamber longitudinal axis and said passage longitudinal axis are substantially coincidental and a fully closed position in which said chamber longitudinal axis and said passage longitudinal axis are perpendicular, said generally spherical outer surface of said valve ball being in scaling engagement with said seals in said fully open and fully closed positions of said valve ball, said valve ball having partially open positions in which said passage longitudinal axis extends at an acute angle to said chamber longitudinal axis, said outer surface of said valve ball having recessed areas that provide fluid flow past said seals between said outer surface of said valve ball and said chamber periphery in said partially open positions of said valve ball.

16. The valve assembly of claim 15 wherein said recessed areas on said outer surface of said valve ball are substantially flat outer surface areas located opposite from said substantially flat passage areas.

17. A valve ball having a rotational axis and a through passage with a longitudinal passage axis that intersects and extends perpendicular to said rotational axis, said valve ball having a generally spherical outer surface and said passage having a passage periphery that defines a ball inner surface, said valve ball having a ball wall between said inner and outer surfaces, said ball wall having substantially flat wall portions with substantially circular outer peripheries on opposite sides of said rotational and passage axes, said passage having opposite passage openings that intersect said generally spherical outer surface, and said substantially flat wall portions being spaced from said passage openings so that said generally spherical outer surface includes generally spherical outer surface portions that extend between said substantially flat wall portions and said passage openings.

18. The valve ball of claim 17 wherein said ball wall has a substantially uniform thickness throughout its extent, and said spherical outer surface portions surround said passage openings.

19. The valve ball of claim 17 wherein said generally spherical outer surface has a ball diameter and each of said substantially flat circular areas has an area diameter that is between 35–55% of said ball diameter.

20. The valve ball of claim 17 wherein said passage has circular passage inlet and outlet openings of the same opening diameter, and said substantially flat wall portions with substantially circular outer peripheries have substantially flat opposite inner surfaces on said ball inner surface that are spaced-apart across said passage a distance that is greater than said opening diameter.

21. A valve ball having a generally spherical outer surface and a through passage with a passage periphery that defines a ball inner surface, said passage having a passage longitudinal axis, said ball having a rotational axis that intersects and extends perpendicular to said passage longitudinal axis and a transverse axis that intersects and extends perpendicular to both said rotational axis and said passage longitudinal axis, said outer surface having a pair of non-spherical outer recessed surface areas therein on opposite sides thereof coincidental with said transverse axis, said inner surface having inner surface areas aligned with said outer recessed surface areas that are of generally the same size and shape as said outer recessed surface areas, said rotational axis intersecting said inner and outer surfaces at ball rotational mounting areas, and said inner and outer surfaces being geometrically similar except in the vicinity of said ball rotational mounting areas.

* * * * *

UNITED STATES PATENT AND TRADEMARK OFFICE
CERTIFICATE OF CORRECTION

PATENT NO. : 6,173,940 B1                                          Page 1 of 1
DATED : January 16, 2001
INVENTOR(S) : Michael J. Kardohely and Adam Pintz It is certified that error appears in the above-identified patent and that said Letters Patent is hereby corrected as shown below:

<u>Column 7,</u>
Line 5, "scaling" should be -- sealing --.

Signed and Sealed this

Twenty-fifth Day of December, 2001

Attest:

Attesting Officer

JAMES E. ROGAN
Director of the United States Patent and Trademark Office